United States Patent
Yang et al.

(10) Patent No.: US 9,546,091 B2
(45) Date of Patent: Jan. 17, 2017

(54) METHOD FOR PREPARING POROUS CARBON NANOFIBERS CONTAINING A METAL OXIDE, POROUS CARBON NANOFIBERS PREPARED USING THE METHOD, AND CARBON NANOFIBER PRODUCTS INCLUDING SAME

(75) Inventors: Kap Seung Yang, Gwangju (KR); Bo Hye Kim, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 817 days.

(21) Appl. No.: 13/578,268

(22) PCT Filed: May 14, 2010

(86) PCT No.: PCT/KR2010/003063
§ 371 (c)(1),
(2), (4) Date: Aug. 10, 2012

(87) PCT Pub. No.: WO2011/099677
PCT Pub. Date: Aug. 18, 2011

(65) Prior Publication Data
US 2013/0027844 A1 Jan. 31, 2013

(30) Foreign Application Priority Data
Feb. 11, 2010 (KR) ........................ 10-2010-0012830

(51) Int. Cl.
*H01B 1/04* (2006.01)
*B29B 9/06* (2006.01)
(Continued)

(52) U.S. Cl.
CPC ................ *B82Y 30/00* (2013.01); *B82Y 40/00* (2013.01); *D01D 5/0007* (2013.01); *D01D 5/247* (2013.01);
(Continued)

(58) Field of Classification Search
CPC ....... B82Y 30/00; B82Y 40/00; D01D 5/0007; D01D 5/247; H01G 11/24; H01G 11/32; H01G 11/84; D01F 9/22; Y10T 428/2918; Y02E 60/13
(Continued)

(56) References Cited

U.S. PATENT DOCUMENTS

2007/0088114 A1* 4/2007 Asgari ................. A61K 9/1664
524/431
2008/0207798 A1 8/2008 Hellring et al.
(Continued)

FOREIGN PATENT DOCUMENTS

CN 1882724 A 12/2006
CN 101238166 A 8/2008
(Continued)

OTHER PUBLICATIONS

Li, et al., A Simple Method for Controllable Preparation of Polymer Nanotubes via a Single Capillary Electrospinning, Langmuir 2007; 23: 10920-10923.*
(Continued)

*Primary Examiner* — Daniel C McCracken
(74) *Attorney, Agent, or Firm* — The PL Law Group, PLLC

(57) ABSTRACT

The present invention relates to carbon nanofibers, and more particularly, to a method capable of preparing metal oxide-containing porous carbon nanofibers having a high specific surface area by changing the composition of a spinning solution, which is used in a process of preparing carbon nanofiber by electrospinning, and to metal oxide-containing porous carbon nanofibers prepared by the method, and carbon nanofiber products comprising the same.

7 Claims, 18 Drawing Sheets

(51) Int. Cl.
  *H01G 9/00* (2006.01)
  *D02G 3/02* (2006.01)
  *D02G 3/22* (2006.01)
  *B01J 20/20* (2006.01)
  *D01F 9/12* (2006.01)
  *B82Y 30/00* (2011.01)
  *B82Y 40/00* (2011.01)
  *D01D 5/00* (2006.01)
  *D01D 5/247* (2006.01)
  *D01F 9/22* (2006.01)
  *H01G 11/24* (2013.01)
  *H01G 11/32* (2013.01)
  *H01G 11/84* (2013.01)

(52) U.S. Cl.
  CPC ............... *D01F 9/22* (2013.01); *H01G 11/24* (2013.01); *H01G 11/32* (2013.01); *H01G 11/84* (2013.01); *Y02E 60/13* (2013.01); *Y10T 428/2918* (2015.01)

(58) Field of Classification Search
  USPC .. 361/502; 252/506; 264/10; 428/367; 502/1
  See application file for complete search history.

(56) References Cited

U.S. PATENT DOCUMENTS

2010/0040834 A1* 2/2010 Dawes et al. ............... 428/158
2010/0278716 A1* 11/2010 Sudo ................... C09D 133/18
 423/447.2

FOREIGN PATENT DOCUMENTS

| KR | 10-0605006 B1 | 7/2006 | |
|---|---|---|---|
| KR | 10-0675923 B1 | 1/2007 | |
| KR | 10-0701627 B1 | 3/2007 | |
| KR | 10-2009-0051793 A | 5/2009 | |
| KR | 10-2009-0121143 A | 11/2009 | |
| WO | WO2007024245 A1 | 3/2007 | |
| WO | 2009/078099 | * 6/2009 | ........... C09D 133/18 |

OTHER PUBLICATIONS

Cited in the European Search Report mailed Feb. 17, 2014 for corresponding EU Pat Appl.
Office action dated Sep. 4, 2013 from SIPO in a counter part Chinese application.
International Search Report for PCT/KR2010/003063.

\* cited by examiner

METHOD FOR PREPARING POROUS CARBON NANOFIBERS CONTAINING A METAL OXIDE, POROUS CARBON NANOFIBERS PREPARED USING THE METHOD, AND CARBON NANOFIBER PRODUCTS INCLUDING SAME

BACKGROUND

1. Technical Field

The present invention relates to carbon nanofibers, and more particularly, to a method capable of preparing metal oxide-containing porous carbon nanofibers having a high specific surface area by changing the composition of a spinning solution, which is used in a process of preparing carbon nanofiber by electrospinning, and to metal oxide-containing porous carbon nanofibers prepared by the method, and carbon nanofiber products comprising the same.

2. Description of the Related Art

With the advent of the ubiquitous era, the development of environmentally friendly and highly efficient materials is necessary to achieve the miniaturization of various electronic telecommunication devices and the practical use of electric vehicles.

In the 21st century, high-tech small-size mobile power systems are needed and the size and weight of these systems must be reduced. In connection with this requirement, highly functional carbon materials have received attention and studies on the development thereof have been made.

Among highly functional carbon materials, activated carbon has a high specific surface area, but the pore structure thereof is very complex, making it difficult to reproduce adsorption and desorption rates. In the case of activated carbon fibers, the fine pores are exposed to the outside, but have a diameter on the micrometer scale, and thus exhibit limited capacity and reaction rate, which make it difficult to use the activated carbon fibers as energy storage media.

On the other hand, carbon nanofibers have a uniform pore distribution and high specific surface area, compared to activated carbon, and can be prepared in the form of paper, felt or nonwoven fabric. Thus, the carbon nanofibers can provide electrode active materials having better performance. In addition, carbon nanofibers having nanographite structures have a relatively large specific surface area and shallow pore depth and include fine pores having a size of 1-2 nm, which show high adsorption and desorption rates. In addition, these carbon nanofibers have a uniform pore structure and a narrow pore size distribution, and thus show fast selective adsorption and desorption even when the energy slightly changes. Thus, these carbon nanofibers have very excellent energy storage properties.

In the carbon nanofiber preparation methods known to date, a chemical activation process should be carried out after a heat-treatment process (stabilization or carbonization process) in order to prepare porous carbon nanofibers. Specifically, after the carbonization process has been carried out at high temperature, the chemical activation process is generally carried out by mixing carbon nanofibers with potassium hydroxide (KOH) or sodium hydroxide (NaOH) at high temperature and then heat-treating the mixture at high temperature. However, in the carbon nanofiber preparation method including the chemical activation process that employs a salt, there are problems in that it is difficult to carry out the process continuously and to prepare large amounts of porous carbon nanofibers, because heat-treatment is carried out after the uniform mixing of the carbon nanofibers with the salt, and a process of removing the added salt is required after the activation process.

Methods of preparing PAN-based carbon nanofibers and pitch-based carbon nanofibers using an electrostatic spinning technique are disclosed in Korean Patent Laid-Open Publication Nos. 2002-0008227 and 10-2003-0002759, respectively. In these patent documents, PAN-based carbon nanofibers are prepared by electrospinning a PAN solution and stabilizing, carbonizing and activating the spun fibers. However, the PAN-based carbon fibers have a low specific surface area and low electrical conductivity, and do not sufficiently exhibit the performance of electrodes for double layer supercapacitors. Meanwhile, the fiber diameter of the pitch-based carbon nanofibers prepared by the above method is disadvantageously very large because the ability to be spun is low.

In recent years, in order to develop electric double-layer capacitors into power supply devices for electric vehicles, which require high output and high capacity properties, studies have been done into the use of carbon nanomaterials as electrodes for electric double-layer capacitors.

Electric double-layer capacitors are devices that use charges accumulated in an electric double layer formed between a solid electrode and an electrolyte, and have received the attention of various fields. Particularly, capacitors have low energy density compared to cells, but exhibit excellent power density properties and are almost semi-permanent, and thus are expected to be used in various fields. Thus, in the case of electrochemical capacitors, research and development has been actively carried out to improve both the energy density and power density of the capacitors. Among energy storage devices, the performance of supercapacitors greatly varies depending on the material and the fabrication technology, and thus it is very important to fabricate supercapacitors having high energy density using newly developed materials.

Electrolytes that are used in electric double-layer capacitors (ELDCs) are largely classified into water soluble electrolytes, organic solvent-based electrolytes and solid electrolytes. Because the potential difference of EDLC unit cells during use is determined by the electrolyte, the choice of electrolyte is very important. Generally, aqueous electric double-layer capacitors have a shortcoming in that their operating voltage is as low as 1.0 V or lower and the amount of energy that can be stored therein is limited. When an organic solvent electrolyte is used to overcome these shortcomings, the capacitor can be used at high cell voltage, and thus can store a large amount of energy.

However, when the organic solvent electrolyte is used, there is the disadvantage of increasing the internal resistance of the capacity so that the charge/discharge characteristics are poor compared to those of aqueous double-layer capacitors. Nevertheless, in this case, a capacitor can be obtained, which has a high potential difference during use and a high energy density that increases in proportion to the square of the voltage during use. This capacitor can be used in a wide temperature range of −25~85° C., can have high breakdown voltage and can be miniaturized.

Electrodes for EDLCs are made mainly of activated carbon materials, which have large specific surface areas and are electrically stable and are also highly electrically conductive. Specifically, the electrodes are made mainly of activated carbon materials or activated carbon fibers prepared by activating materials from coal or petroleum pitch, phenol resin, woody and carbon precursor polymers as starting materials using an oxidative gas or an organic salt at a temperature lower than 1200° C.

Methods for increasing the energy density of electric double-layer capacitors include methods of fabricating hybrid capacitors (10-20 Wh/kg) using the asymmetric electrode technique, and methods of fabricating electric double-layer capacitors (20-40 Wh/kg) from high-capacity activated carbon prepared using an alkaline activator (*The Korean Institute of Electrical and Electronic Material Engineers*, 17, 1079 (2004); *Mat. Res. Soc. Proc.*, San Francisco, Calif., 397 (1995); *J. Electrochem. Soc.*, 148, A930 (2001); *Electrochem.*, 69, 487 (2001); *Carbon*, 43, 2960 (2005)). In the case of the latter, the graphite carbon material is heat-treated with an alkaline material (KOH, NaOH or $K_2CO_3$) at a high temperature of 700~900° C., and the activated material has a capacitance of about 30-50 F/mL per electrode volume at 3.5 V. However, it was reported that activated carbon materials prepared by the alkaline activation method have problems in that they should be heat-treated during their preparation, corrode containers, the characteristics thereof are deteriorated due to charge/discharge cycles and the production cost thereof is high.

Meanwhile, activated carbon fibers which are currently produced and sold are mainly prepared by obtaining fibers from precursors using an expensive melt-spinning or melt-blown spinning apparatus, and then stabilizing and carbonizing or activating the fibers. However, the process used in this preparation method is complex, and the diameter of the fibers is large, making it difficult to effectively increase the specific surface per volume.

In addition, when the prepared fibers are to be used as electrode active materials, a process of crushing the fibers and adding a binder or a conductive material thereto should be carried out. Furthermore, when the fibers are used in the form of woven fabric as an electrode, the density of the electrode is low because of the large diameter of the fibers, and thus the high-speed charge/discharge or high-output properties are deteriorated.

Accordingly, there is a need to develop carbon nanofibers which overcome the above-described problems.

SUMMARY

Accordingly, the present inventors have made extensive efforts to solve the above-described problems and, as a result, have developed a method of preparing carbon nanofibers having a high specific surface area, thereby completing the present invention.

It is, therefore, an aspect of the present invention to provide a method of preparing highly porous carbon nanofibers containing a metal oxide by adding a metal alkoxide to a carbon nanofiber precursor solution and performing a carbonization or activation process, and porous carbon nanofibers prepared by the method, which have a large specific surface area and improved electrical conductivity, as well as products including the carbon nanofibers.

Another aspect of the present invention is to provide a method of preparing porous carbon nanofibers having ultra-fine and highly porous fiber webs in a time and cost-effective manner by a heat-treatment process only without carrying out a chemical activation process, and carbon nanofibers prepared by the method, as well as products comprising the carbon nanofibers.

Still another aspect of the present invention is to provide a method for preparing carbon nanofibers, in which the properties of the metal oxide-containing carbon nanofibers are easily controlled as desired by controlling one or more of the concentration of the metal alkoxide, the heat-treatment temperature and time and the activation process to control the specific surface area and pore size distribution of the metal alkoxide-containing carbon nanofibers.

Still another aspect of the present invention is to provide a method for preparing metal oxide-containing porous carbon nanofibers, in which a metal alkoxide is introduced into the carbon crystals of the carbon nanofibers so that the dielectric constant between an electrolyte and the electrode surface can be increased to increase energy density, and the carbon nanofibers can show fast adsorption and desorption even when the energy changes slightly, and thus have excellent storage properties and provide high-performance capacitors, and carbon nanofibers prepared by the method, as well as products comprising the carbon nanofibers.

Still another aspect of the present invention is to provide a high-capacitance capacitor having excellent electrochemical properties, charge/discharge characteristics, and energy and power densities, the capacitor being fabricated by applying carbon nanofibers having porous fiber webs, prepared through a carbonization process, to an aqueous electrolyte.

Yet another aspect of the present invention is to provide a supercapacitor which is fabricated by applying porous carbon nanofibers, prepared by an activation process using a steam-containing gas such that a metal oxide remains, to an organic solvent electrolyte, the capacitor having significantly improved electrochemical characteristics, capacitance, power density and energy density and being capable of being applied to power storage devices.

The aspects of the present invention are not limited to the above-mentioned aspects, and other aspects will be clearly apparent to those skilled in the art from the following description.

In order to accomplish the above aspects, in a first aspect, the present invention provides a method for preparing porous carbon fibers, the method comprising the steps of: preparing a carbon nanofiber precursor solution containing a metal alkoxide $[M(OR)_n]$; electrospinning the precursor solution to obtain electrospun fibers; stabilizing the electrospun fibers to obtain stabilized fibers; and carbonizing the stabilized fibers to obtain porous carbon fibers.

In a second aspect, the present invention provides a method for preparing porous carbon fibers containing a metal oxide, the method comprising the steps of: preparing a carbon nanofiber precursor solution containing a metal alkoxide $[M(OR)_n]$; electrospinning the precursor solution to obtain electrospun fibers; stabilizing the electrospun fibers to obtain stabilized fibers; and physically activating the stabilized fibers.

In an embodiment, the precursor solution is prepared to contain the carbon nanofiber precursor and the metal alkoxide at a ratio of 70-99:30-1 wt %.

In an embodiment, the metal alkoxide is at least one of Si-alkoxide, Ti-alkoxide, Al-alkoxide, and Zn-alkoxide.

In an embodiment, the stabilization step is carried out by placing the electrospun fibers in a hot air circulating furnace, supplying compressed air to the furnace at a flow rate of 5-20 mL/min, and maintaining the fibers at 200~300° C. at a heating rate of 1° C./min for 30 minutes or more.

In an embodiment, the carbonizing step is carried out by heating the fibers to 700~1500° C. at a rate of 5° C./min in an inert or vacuum atmosphere, and then maintaining the fibers at that temperature for 30 minutes or more.

In an embodiment, the physical activation step is carried out by heating the fibers to 700~850° C. at a rate of 5° C./min, and then maintaining the fibers in an atmosphere of 150-250 mL/min of inert gas and 5-15 vol % of steam for 30 minutes or more.

In an embodiment, one or more of the diameter and surface porosity of the carbon nanofibers may be controlled by controlling one or more of the concentration of the metal alkoxide, the carbonization temperature, the activation temperature and time.

The present invention also provides metal oxide-containing porous carbon fibers, which are prepared by any one of the preparation methods according to the first and second aspects.

In an embodiment, the porous carbon nanofibers prepared by the method according to the first aspect have a diameter of 100-300 nm and a specific surface area of 700-1300 $m^2/g$, and include fine holes having a size of 1-3 nm.

In an embodiment, the porous carbon nanofibers prepared by the method according to the second aspect have a diameter of 100-250 nm, a specific surface area of 1000-1700 $m^2/g$ and include fine pores and mesopores, which have a size of 2 nm or more.

The present invention also provides a high-capacitance supercapacitor comprising: an electrode made of the metal oxide-containing porous carbon fibers prepared by the method of the first aspect; and a water-soluble electrolyte.

In an embodiment, functional groups produced on the surface of the metal oxide-containing porous carbon nanofibers by carbonization participate in the specific capacitance of a pseudo-capacitor electrode so that the supercapacitor has the capacitance of a pseudo-capacitor.

The present invention also provides ultrahigh-capacitance supercapacitor comprising: an electrode made of the metal oxide-containing porous carbon fibers prepared by the method of the second aspect; and an organic solvent electrolyte.

In an embodiment, the supercapacitor has high energy density as a result of the process in which a sol-gel reaction in the pores in the surface of the metal oxide-containing porous carbon nanofibers is promoted by activation.

The present invention also provides an adsorbent comprising the metal oxide-porous carbon nanofibers of the present invention.

In addition, the present invention also provides an electromagnetic wave-shielding material comprising the metal oxide-porous carbon nanofibers of the present invention.

DETAILED DESCRIPTION

Figure 1:
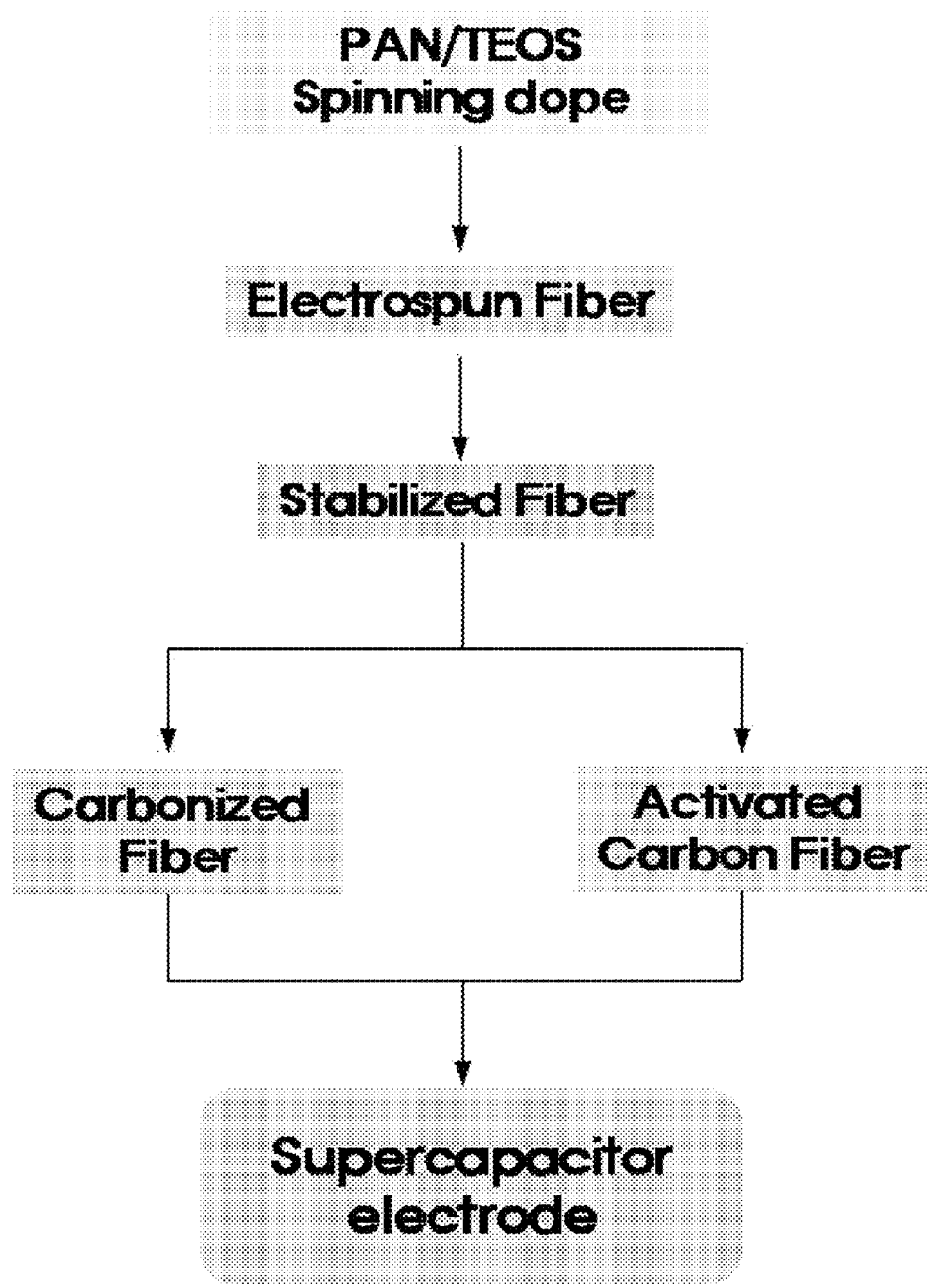
FIG. 1 is a schematic flow diagram showing a method of preparing porous carbon nanofibers according to the present invention and the application of the porous carbon nanofibers to a high-capacitance supercapacitor.

Although the usage of the general terms which are currently widely used was selected within the realm of the possible in the present invention, terms optionally selected by the applicant will be used in specific cases, wherein their meaning will be defined and described in detail in the corresponding detailed description of the present invention. Accordingly, the terms used in the present invention should be understood by their true meaning.

Hereinafter, the technical configuration of the present invention will be described in detail with reference to an embodiment of the present invention.

However, the present invention is not limited to the embodiment described herein and may also be embodied in other forms. Throughout the specification, like reference numerals used to describe the present invention indicate like elements.

In the method of preparing carbon nanofibers by electrospinning according to the present invention, a metal alkoxide is added to a carbon fiber precursor solution at a specific weight ratio, so that porous carbon nanofibers can be prepared using the sol-gel reaction of the metal alkoxide. The porous carbon nanofibers thus prepared have excellent properties, including high porosity, high specific surface area, high energy density and high energy storage capacity. Due to such excellent properties, various products comprising the porous carbon nanofibers of the present invention, including supercapacitors, fuel cells, secondary battery electrodes, electromagnetic wave-shielding materials, highly conductive materials, and adsorbents, also have excellent quality.

Thus, the inventive method for preparing porous carbon nanofibers comprises the steps of: preparing a carbon nanofiber precursor solution containing a metal alkoxide [M(OR)$_n$]; electrospinning the precursor solution to obtain sound precursor fibers; stabilizing the electrospun fibers to obtain stabilized fibers; and then either carbonizing the stabilized fibers to obtain porous carbon nanofibers, or physically activating the stabilized fibers to obtain porous carbon nanofibers.

Herein, the carbon nanofiber precursor that is used in the present invention may be any known material, but, for example, may be a polyacrylonitrile (PAN) for fiber use. The PAN (molecular weight=about 160,000) may be a PAN homopolymer or a PAN copolymer containing 5-15 wt % of a comonomer. Herein, the comonomer may be itaconic acid or methylacrylate (MA).

The metal alkoxide [(M(OR)$_n$] that is used in the present invention may be any known material, but, for example, may be any one of metal alkoxides in which M is Si, Ti, Al or Zr, that is, Si-alkoxide, Ti-alkoxide, Al-alkoxide and Zn-alkoxide.

The metal alkoxide which is contained in the carbon fiber precursor solution may be used at a ratio of 1-30 wt % relative to the carbon fiber precursor. Thus, the carbon fiber precursor solution is prepared to contain the carbon nanofiber precursor and the metal alkoxide at a ratio of 70-99: 30-1 wt %.

As a solvent in which the carbon nanofiber precursor and the metal alkoxide are dissolved, any solvent may be used without particular limitation, so long as it can dissolve both the carbon fiber precursor and the metal alkoxide. For example, any one of dimethylformamide (DMF), DMSO and THF is used.

The concentration of the carbon fiber precursor in the carbon fiber precursor solution may be 5-30%. If the concentration of the carbon fiber precursor is out of this range, the precursor will be difficult to spin and fibers will not be easily formed.

In the method of the present invention, the stabilizing step is carried out by placing the fibers in a hot air circulating furnace, supplying compressed air to the furnace at a flow rate of 5-20 mL/min, and maintaining the fibers at 200~300° C. at a heating rate of 1° C./min for 30 minutes or more.

Figure 2:
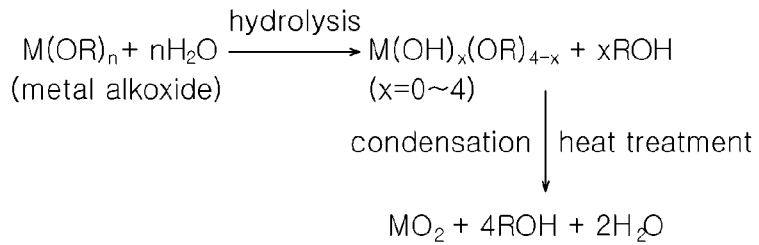
FIG. 2 shows a mechanism in which the sol-gel reaction of a metal alkoxide occurs.

Then, when the stabilized fibers are carbonized, the carbonization may be carried out by heating the fibers to 700~1500° C. at a rate of 5° C./min in an inert or vacuum atmosphere and then maintaining the fibers at that temperature for 30 minutes or more. As shown in FIG. 2, when a metal oxide is produced from the metal alkoxide by a sol-gel reaction, water and alcohol are produced as byproducts and are partially removed from the metal oxide during the high-temperature carbonization step, and thus carbon nanofibers having surface pores are prepared.

The inventive porous carbon nanofibers thus obtained have a diameter of 100-300 nm and a specific surface area of 700-1300 m$^2$/g and include fine pores having a size of 1-3 nm. As described above, the specific surface of the porous carbon nanofibers and the size of the fine pores can be controlled depending on the content of the metal alkoxide and the heat-treatment temperature.

Meanwhile, when the stabilized fibers are activated, the activation may be carried out by heating the fibers to 700~850° C. at a rate of 5° C./min and then maintaining the fibers at that temperature in an atmosphere of 150-250 mL/min of inert gas and 5-15 vol % of steam for 30 minutes, and, for example, in an atmosphere of 200 mL/min of inert gas and 10 vol % of steam for 60 minutes or more.

Specifically, steam which is used in the physical activation of the fibers promotes the hydrolysis and condensation of the metal alkoxide, and water and alcohol which are removed during the production of metal oxide accelerate the sol-gel reaction of the metal alkoxide according to Le Chatelier's principle, thereby producing an increased number of fine pores and enlarged pores in the surface.

The inventive porous activated carbon nanofibers obtained by physical activation as described above have a diameter of 100-250 nm and a specific surface area of 1300-1700 m$^2$/g and include fine pores and mesopores, which have a size 2 nm or more. When such carbon nanofiber structures are applied to electrodes for capacitors, they can match the size of organic solvent electrolyte ions, making it possible to fabricate supercapacitors having high energy density.

According to the present invention, one or more of the diameter and surface porosity (including specific surface area and the size of fine pores and mesopores) of the carbon nanofibers can be controlled by controlling the concentration of the metal alkoxide in the carbon nanofiber precursor solution, the carbonization temperature and time and the activation temperature and time.

Example 1

A polyacrylonitrile (PAN) homopolymer as a carbon nanofiber precursor and tetraethyl orthosilicate (Si(OEt)$_4$, TEOS) (Si-alkoxide) as a metal alkoxide [(M(OR)$_n$] were prepared. The prepared PAN and TEOS were dissolved in the solvent DMF, thereby preparing a carbon nanofiber precursor solution. Herein, the carbon nanofiber precursor solution was prepared to have a carbon nanofiber precursor concentration of 10% and to contain PAN and Si-alkoxide at a ratio of 80:20 wt %.

Then, the prepared carbon nanofiber precursor solution was electrospun to prepare nonwoven fabric webs consisting of nanofibers, thereby obtaining electrospun fibers.

In the electrospinning process, a voltage of 25 kV was applied to each of the nozzle and collector of the electrospinning apparatus, and the distance between the spinneret and the collector was set at about 20 cm and could be changed if necessary.

The electrospun fibers resulting from the electrospinning process were stabilized by placing the fibers in a hot air circulating furnace, supplying compressed air to the furnace at a flow rate of 20 mL/min, heating the fibers at a rate of 1° C./min to 280° C. and maintaining the fibers at that temperature for 50 minutes, thereby obtaining stabilized insoluble fibers.

Example 2

The stabilized fibers were carbonized by heating the fibers to 800° C. at a rate of 5° C./min in an inert atmosphere and then maintaining the fibers at that temperature for 50 minutes, thereby preparing porous carbon nanofibers 1.

Example 3

The procedure of Examples 1 and 2 was repeated, except that the carbonization temperature was increased to 900° C., thereby preparing porous carbon nanofibers 2.

Example 4

The procedure of Examples 1 and 2 was repeated, except that the carbonization temperature was increased to 1000° C., thereby preparing porous carbon nanofibers 3.

Example 5

The procedure of Example 2 was repeated, except that the carbon nanofiber precursor solution was prepared to contain PAN and Si-alkoxide at a ratio of 70:30 wt %, thereby preparing porous carbon nanofibers 4.

Example 6

The procedure of Example 3 was repeated, except that the carbon nanofiber precursor solution was prepared to contain PAN and Si-alkoxide at a ratio of 70:30 wt %, thereby preparing porous carbon nanofibers 5.

Example 7

The procedure of Example 4 was repeated, except that the carbon nanofiber precursor solution was prepared to contain PAN and Si-alkoxide at a ratio of 70:30 wt %, thereby preparing porous carbon nanofibers 6.

Example 8

The stabilized fibers obtained in Example 1 were heated to 800° C. at a rate of 5° C./min and then maintained at that temperature for 60 minutes in an atmosphere of 200 mL/min of inert gas and 10 vol % of steam, thereby preparing porous carbon nanofibers 7.

Example 9

The procedure of Example 8 was repeated, except that the carbon nanofiber precursor solution was prepared to contain PAN and Si-alkoxide at a ratio of 70:30 wt %, thereby preparing porous carbon nanofibers 8.

Example 10

Each of the porous carbon fibers 4 to 6 prepared in Examples 5 to 7 were cut to a suitable size and placed on Ni foam collectors to form positive and negative electrodes, and a Celgard (polypropylene) separator was inserted between the positive and negative electrodes, after which a 6M KOH aqueous electrolyte solution was impregnated into the resulting structure, thereby fabricating supercapacitors 1 to 3.

Example 11

Each of the porous carbon fibers 7 and 8 prepared in Examples 8 and 9 were cut to a suitable size and placed on Ni foam collectors to form positive and negative electrodes, and a Celgard (polypropylene) separator was inserted between the positive and negative electrodes, after which a 1.5M organic solvent electrolyte solution of tetraethylammonium tetrafluoroborate in acetonitrile was impregnated into the resulting structure, thereby fabricating supercapacitors 4 and 5.

COMPARATIVE EXAMPLE

Comparative carbon nanofibers were prepared in the same manner as in Example 3, except that only PAN was used as the solute without using metal alkoxide.

Test Example 1

The electrospun fibers obtained in Example 1 were thermally analyzed at a heating rate of 10° C./min in an atmosphere of $N_2$. The analysis results are shown in FIG. 3.

Figure 3:
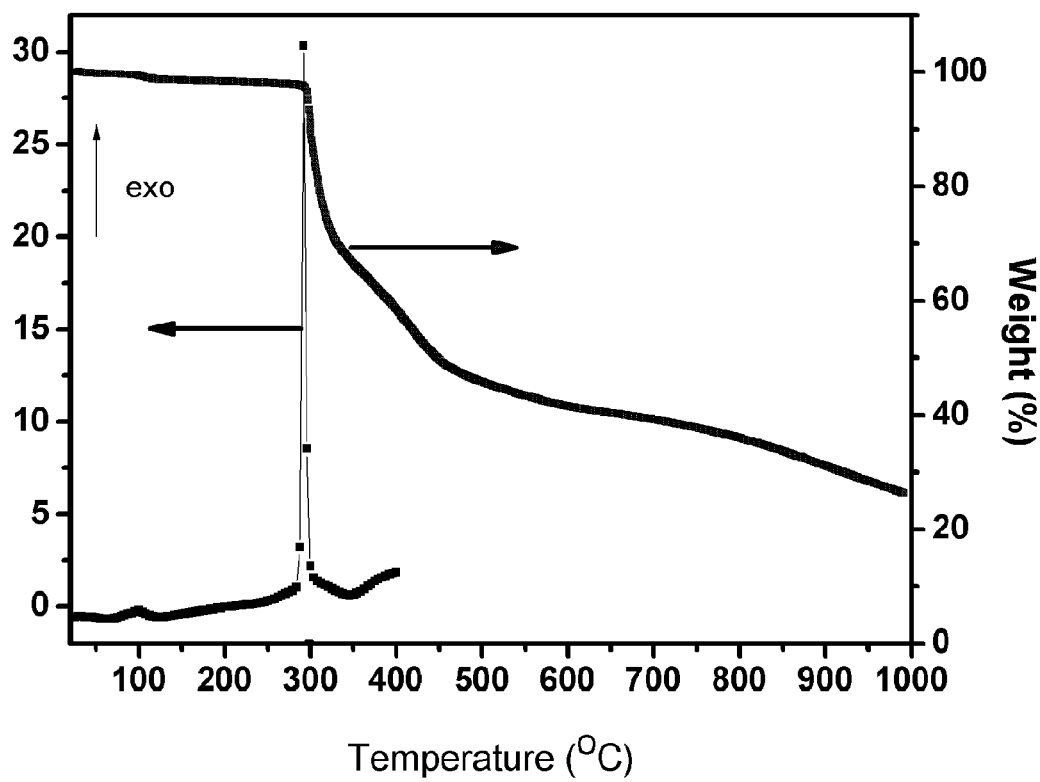
FIG. 3 is a graphic diagram showing the results of thermal analysis of electrospun fibers obtained in Example 1.

As can be seen in the thermogravimetric analysis (TGA) graph in FIG. 3, a major change in weight appeared at 280~330° C. At 330° C. or higher, a slow decrease in weight appeared, and at 1000° C., a residual amount of 28% appeared. In addition, in the differential scanning calorimetry (DSC) in FIG. 3, a very high exothermic peak appeared at 280~330° C., as in the TGA graph, suggesting that thermal decomposition of the precursor fibers occurred in this temperature range.

Test Example 2

The electrospun fibers and stabilized fibers obtained in Example 1 were analyzed by differential scanning calorimetry (DSC) at a heating rate of 10° C./min in a nitrogen atmosphere. The results are shown graphically in FIG. 4.

Figure 4:
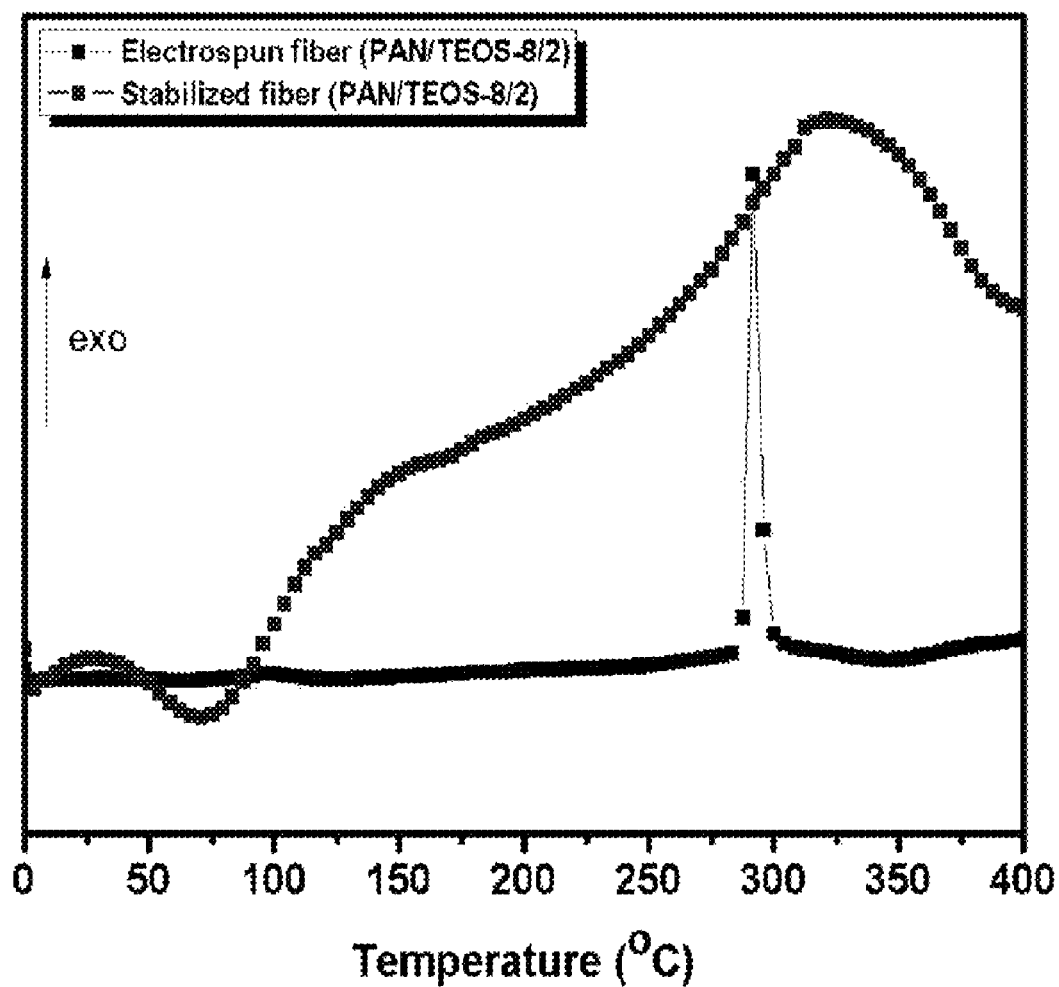
FIG. 4 is a graphic diagram showing the results of differential scanning calorimetry (DSC) analysis carried out by heating electrospun fibers and stabilized fibers, obtained in Example 1 of the present invention, at a heating rate of 10° C./min in a nitrogen atmosphere.

As can be seen in FIG. 4, the electrospun fibers showed a very strong exothermic peak at around 287° C., and this was believed to be because of the influence of the cyclization of the nitrile group during the stabilization process. In the DSC graph of the stabilized fibers, an exothermic peak appeared over the broad range of 320~350° C., because the cyclization or crosslinking of the nitrile group remaining in the precursor fibers continuously took place. In addition, unlike the electrospun fibers, the stabilized fibers showed a strong endothermic peak at around 100° C. due to the evaporation of water or alcohol, because the stabilized fibers contained increased amounts of functional groups such as $C=O$, $C=O$ and $C-OH$.

Test Example 3

Figure 5:
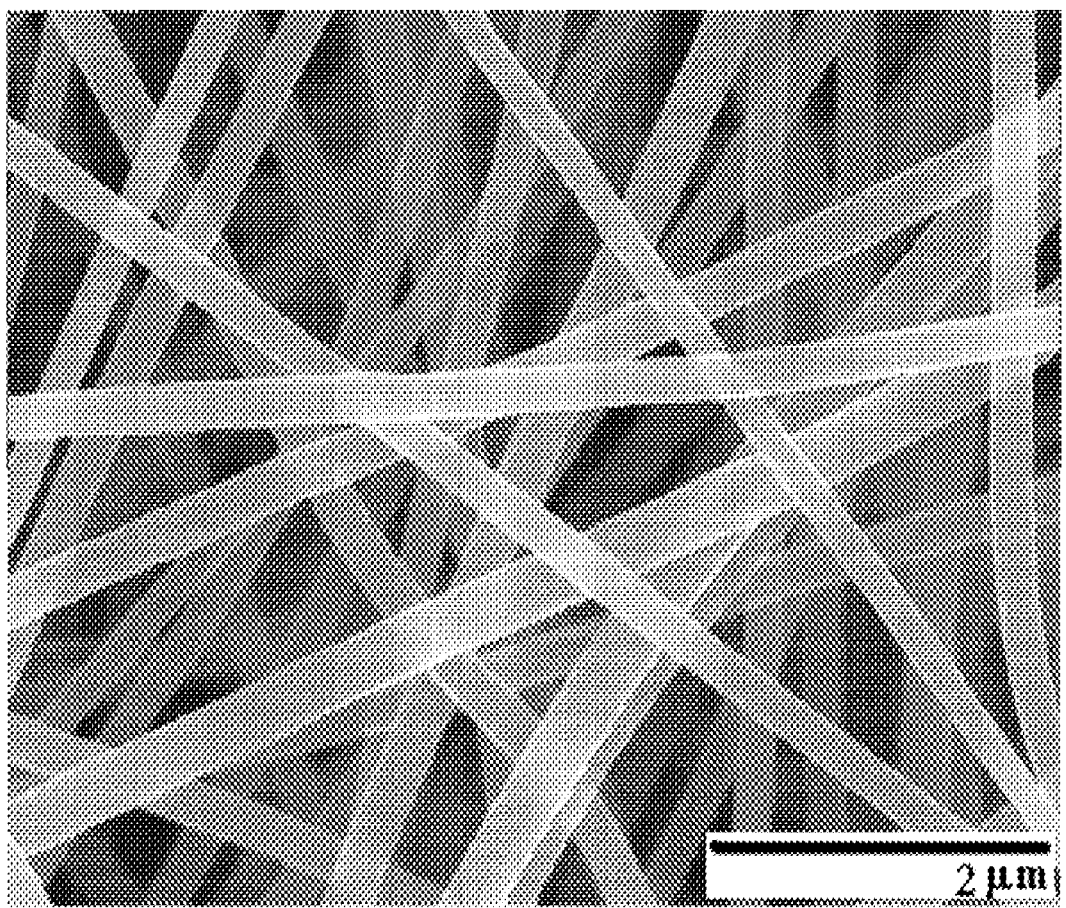
FIG. 5 is a high-magnification scanning electron microscope (SEM) photograph of carbon nanofibers 1 obtained at a carbonization of 800° C. in Example 2 of the present invention.
Figure 6:
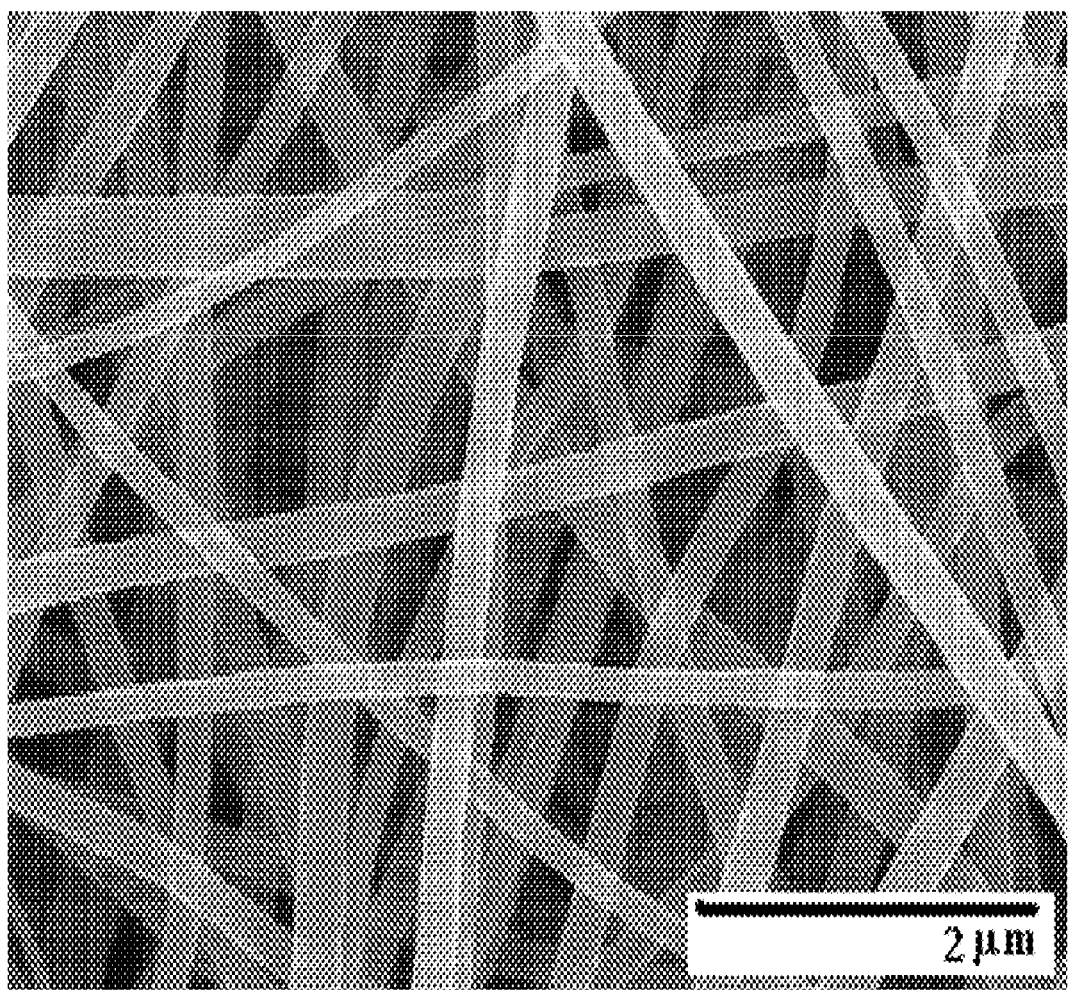
FIG. 6 is a scanning electron microscope (SEM) photograph of porous carbon nanofibers 2 obtained at a carbonization of 900° C. in Example 3 of the present invention.
Figure 7:
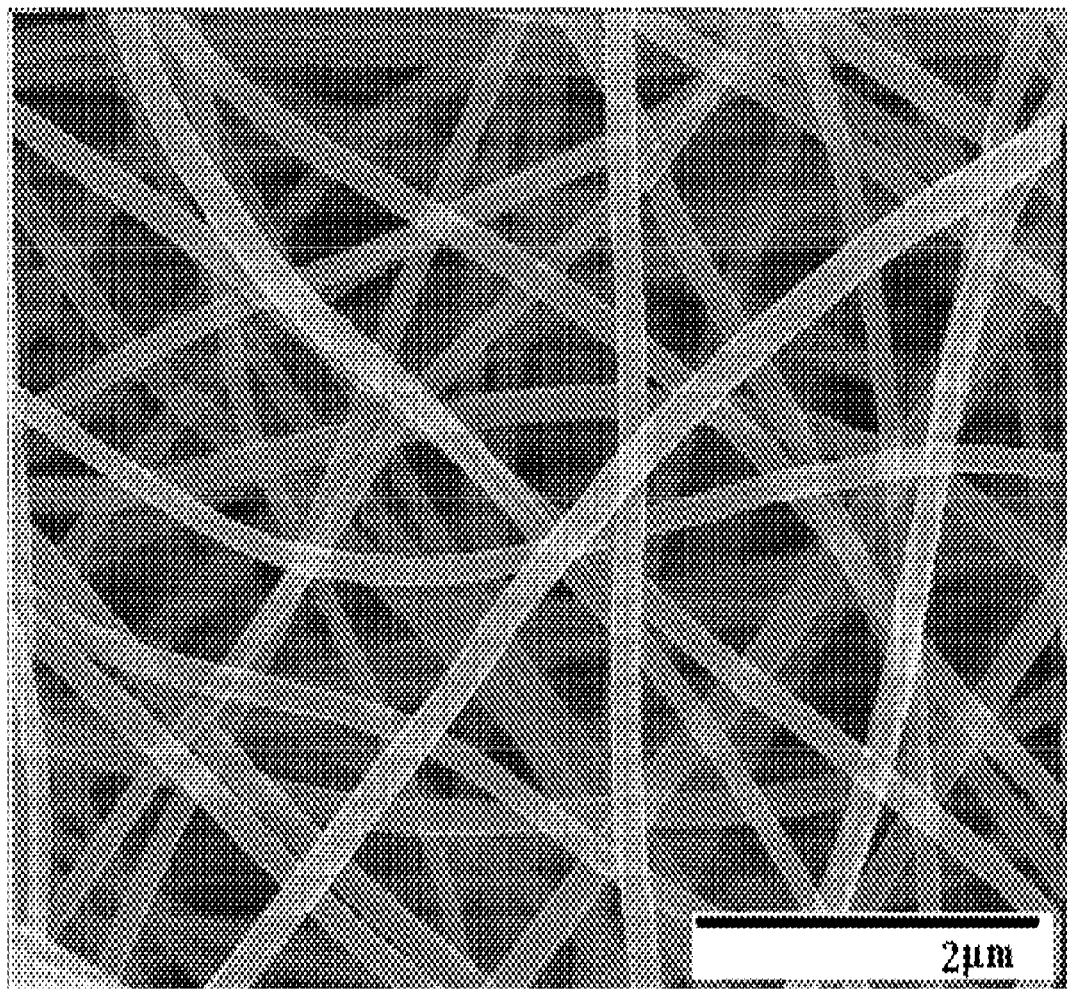
FIG. 7 is a scanning electron microscope (SEM) photograph of porous carbon nanofibers 3 obtained at a carbonization of 1000° C. in Example 4 of the present invention.

Porous carbon fibers 1 to 3 obtained in Examples 2 to 4 were observed with a scanning electron microscope (SEM), and the SEM photographs are shown in FIGS. 5 to 7. As can be seen in FIGS. 5 to 7, carbon nanofibers could be easily produced by the method of the present invention without producing particles or beads, and the diameter of the carbon nanofibers decreased as the carbonization temperature increased.

Particularly, carbon nanofibers, including porous carbon nanofibers 1 to 6, were prepared at varying carbonization temperatures and the average diameters thereof were measured. As a result, as shown in Table 1 below, the average diameter decreased as the carbonization temperature increased.

TABLE 1

| Carbonization temperature (° C.) | Average diameter (nm) |
|---|---|
| 800 | 200-300 |
| 900 | 170-260 |
| 1000 | 150-175 |

Test Example 4

Figure 8:
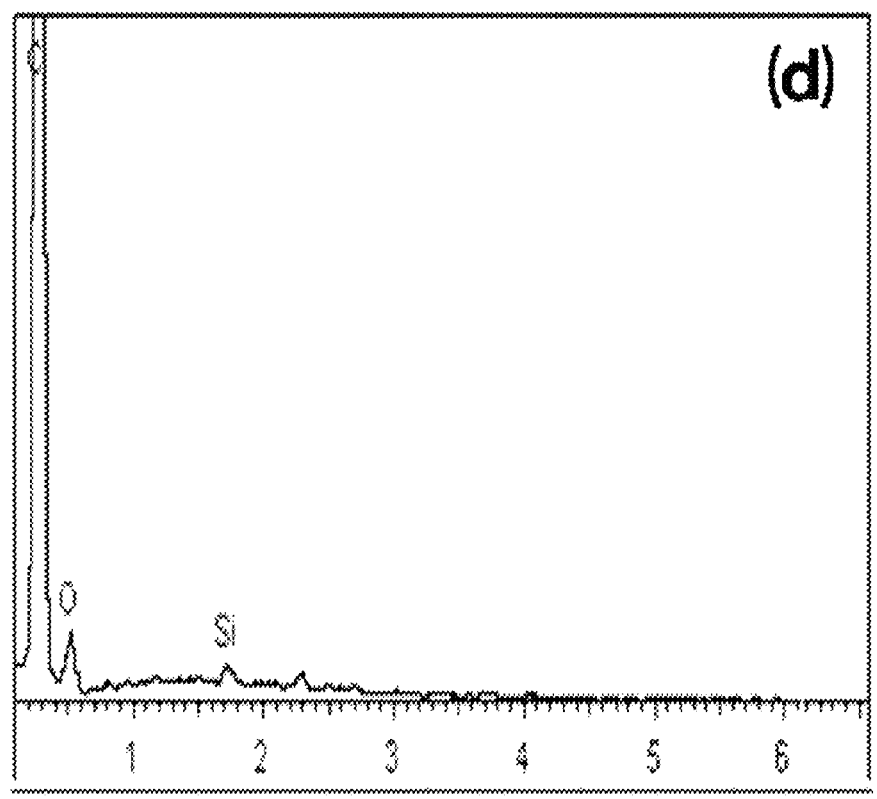
FIG. 8 is a graph showing the results of energy dispersive X-ray (EDX) analysis of porous carbon nanofibers 3 carbonized at 1000° C. in Example 4 of the present invention.

Porous carbon nanofibers 3 obtained in Examples 4 were analyzed by energy dispersive X-ray (EXD) analysis, and the analysis results are shown in FIG. 8.

As can be seen in FIG. 8, C, O and Si elements could be observed in the carbon nanofibers prepared using tetraethyl orthosilicate ($Si(OEt)_4$, TEOS) as the metal alkoxide.

Test Example 5

Figure 9:
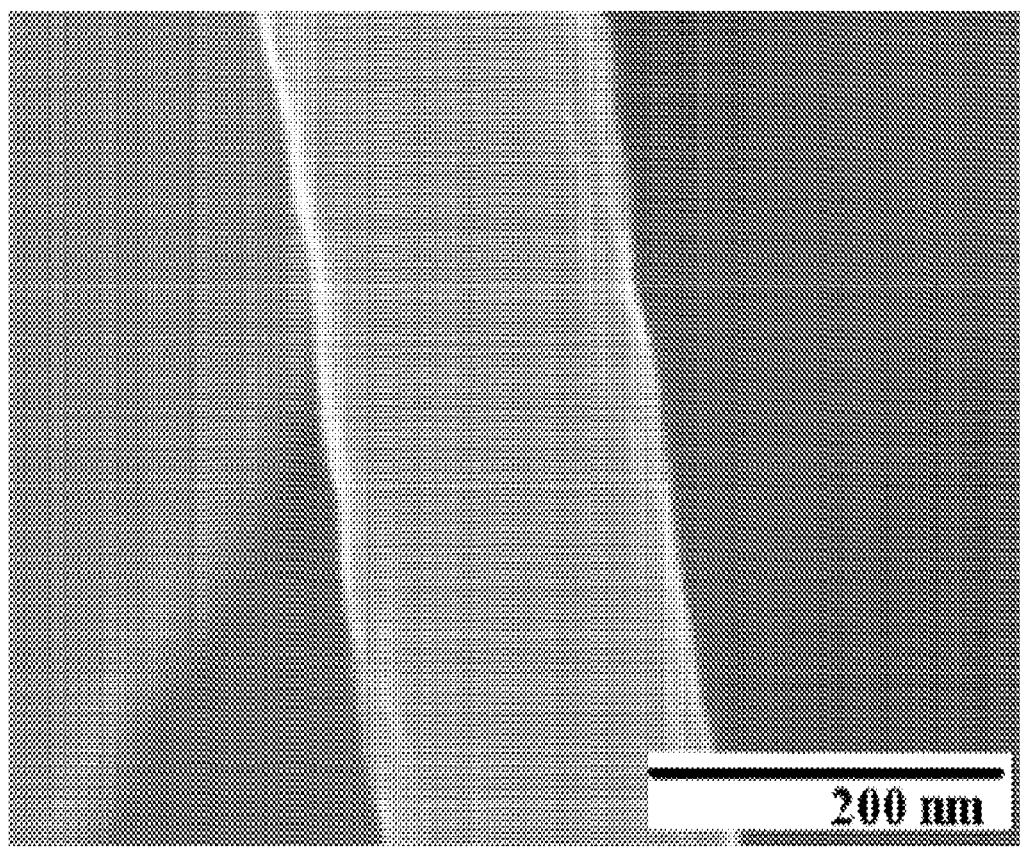
FIG. 9 is a high-magnification scanning microscope (SEM) photograph of porous carbon nanofibers 1 obtained at a carbonization temperature of 800° C. in Example 2 of the present invention.
Figure 10:
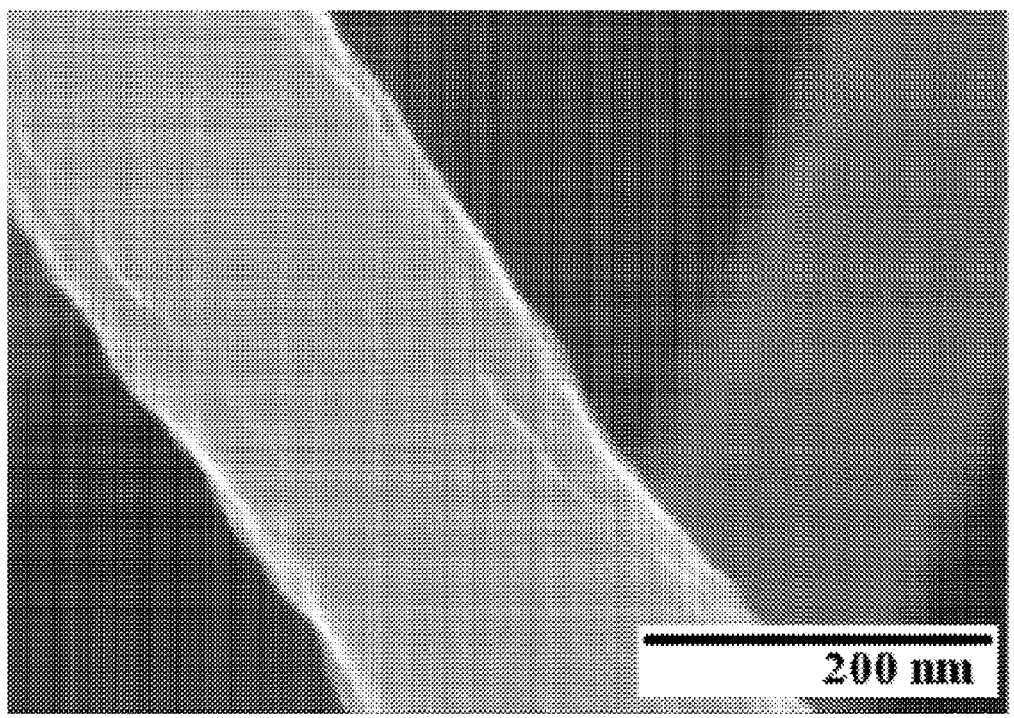
FIG. 10 is a high-magnification scanning microscope (SEM) photograph of porous carbon nanofibers 2 obtained at a carbonization temperature of 900° C. in Example 3 of the present invention.
Figure 11:
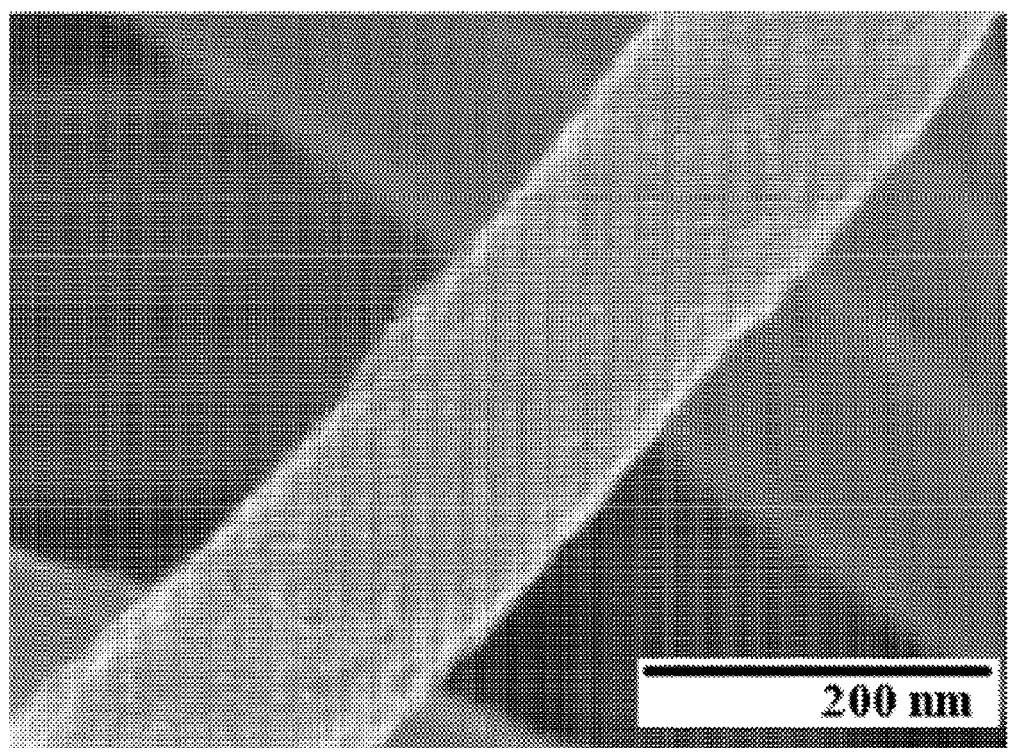
FIG. 11 is a high-magnification scanning microscope (SEM) photograph of porous carbon nanofibers 3 obtained at a carbonization temperature of 1000° C. in Example 4 of the present invention.

The surfaces of porous carbon nanofibers 1 to 3 obtained in Examples 2 to 4 were observed with a high-magnification scanning electron microscope (SEM), and the SEM photographs are shown in FIGS. 9 to 11.

As can be seen in FIGS. 9 to 11, the size of fine pores in the surface increased as the carbonization temperature increased.

Test Example 6

Porous carbon nanofibers 1 to 3, obtained in Examples 2 to 4, and the comparative carbon nanofibers obtained in the Comparative Example were measured for BET specific surface areas, pore volumes and average pore sizes, and the measurement results are shown in Table 2 below.

As can be seen in Table 2, as the carbonization temperature increased, the BET specific surface area, pore volume and average pore size of the porous carbon nanofibers prepared using the metal alkoxide increased, and these were higher than those of the comparative carbon nanofibers prepared using PAN only. Thus, it can be seen that that electric double-layer capacitors (EDLCs) made of the porous carbon nanofibers prepared using the metal alkoxide as described in the present invention have high specific capacitance and a stable cycle life, because the surface of the porous carbon nanofibers has developed fine pores.

TABLE 2

| Carbonization temperature | BET surface area ($m^2/g$) | Pore volume ($cm^3/g$) | Average pore size (Å) |
|---|---|---|---|
| Porous carbon nanofibers 1 carbonized at 800° C. | 732.20 | 0.287 | 15.7 |
| Porous carbon nanofibers 2 carbonized at 900° C. | 950.78 | 0.376 | 16.2 |
| Porous carbon nanofibers 3 carbonized at 1000° C. | 1300.25 | 0.782 | 18.0 |
| Comparative carbon nanofibers carbonized at 1000° C. | 336.75 | 0.136 | 15.2 |

Test Example 7

The BET specific surface area, pore volume and average pore size of porous carbon nanofibers 1 to 3, obtained in Examples 2 to 4, and porous carbon nanofibers 7 and 8 obtained in Examples 7 and 8 were measured, and the measurement results are shown in Table 3 below.

TABLE 3

| | T-plot surface area | Total volume ($cm^3/g$) | Mesopore volume fraction (%) | Micropore volume fraction (%) | Average pore size (Å) |
|---|---|---|---|---|---|
| Porous carbon nanofibers 1 | 986.3 | 0.374 | 20 | 80 | 15.73 |
| Porous carbon nanofibers 2 | 1045.6 | 0.404 | 22 | 78 | 16.25 |
| Porous carbon nanofibers 3 | 1200.2 | 0.536 | 28 | 72 | 18.08 |
| Porous carbon nanofibers 7 | 1386.9 | 0.571 | 35 | 65 | 19.65 |
| Porous carbon nanofibers 8 | 1483.3 | 0.604 | 40 | 60 | 20.18 |

As can be seen in Table 3, the BET specific surface area, pore volume and average pore size of porous carbon fibers 7 and 8 prepared using the physical activation process increased compared to those of porous carbon nanofibers 1 to 3 prepared using the carbonization process. This suggests that steam in the activation process promotes the hydrolysis and condensation of TEOS to accelerate the sol-gel reaction of the TEOS, thereby increasing the mesopore volume fraction. In addition, it can be seen that, as the weight ratio of TEOS increases, the amount of precursor that can be subjected to the sol-gel reaction increases, and thus the specific surface area increases.

Test Example 8

Figure 12:
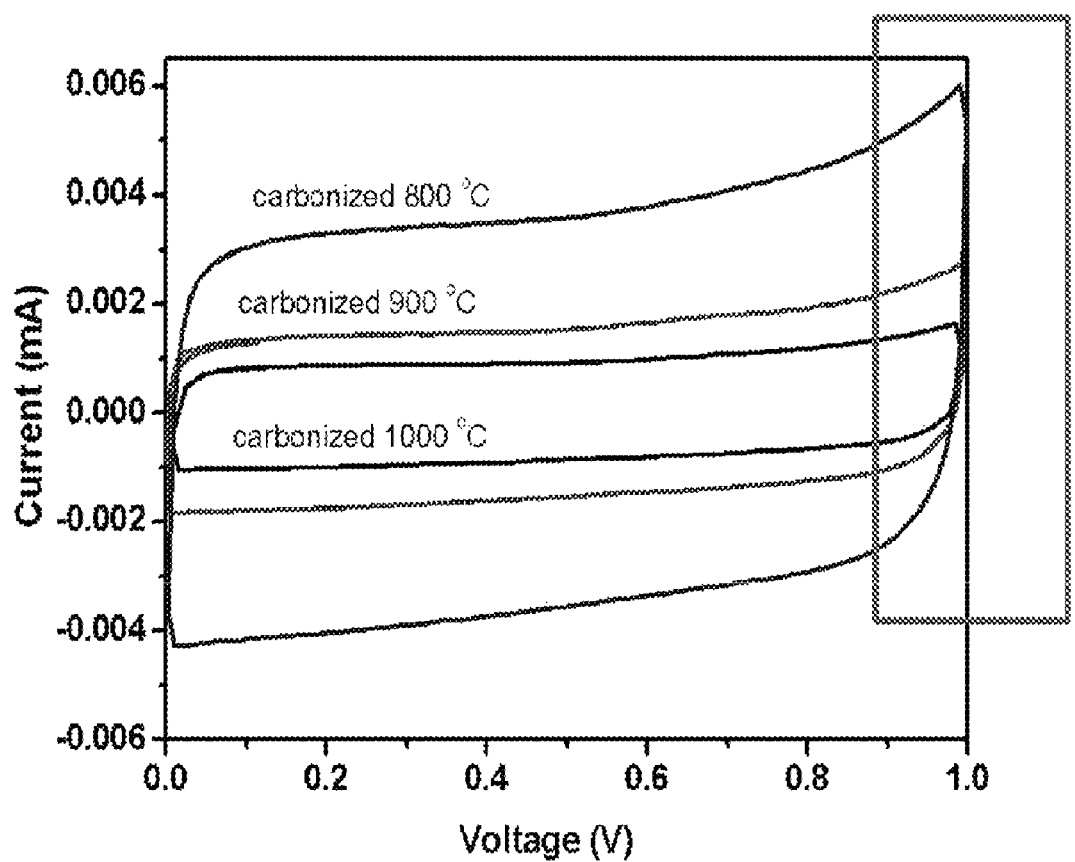
FIG. 12 shows cyclic voltammogram (CV) graphs of capacitors comprising porous carbon nanofibers 4 to 6, obtained in Examples 5 to 7 of the present invention, as a function of carbonization temperature in an aqueous electrolyte solution of 6M KOH.

The cyclic voltammograms of supercapacitor electrodes 1 to 3 comprising porous carbon nanofibers 4 to 6 prepared in Examples 5 to 7 were measured in a 6M KOH aqueous solution as an electrolyte, and the measurement results are shown in FIG. 12. Herein, the measurement was carried out at a voltage of 0-1.0 V and a scanning speed of 25 mV/s. As can be seen in FIG. 12, as the carbon temperature decreased (1000→800° C.), the specific surface area increased, but the capacitance decreased. In addition, the cyclic voltammograms did not show a rectangular shape, which is shown in typical EDLCs, but showed a quasi-rectangular shape at the end portion corresponding to 1V.

Test Example 9

Figure 13:
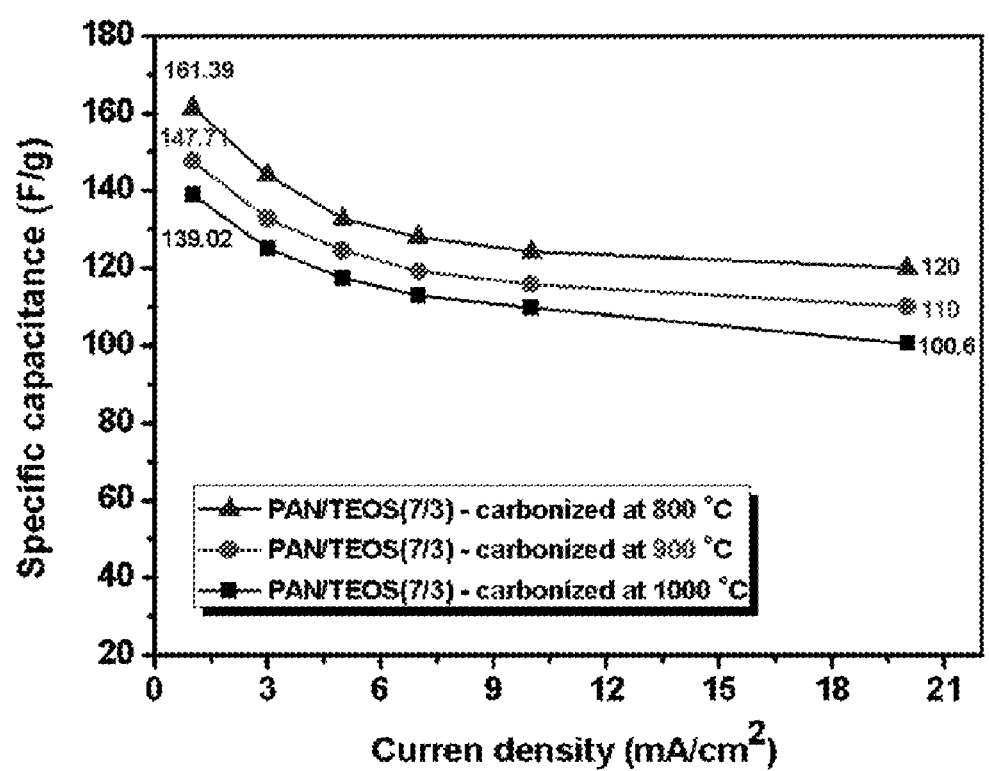
FIG. 13 is a graphic diagram showing the specific capacitances of capacitors comprising porous carbon fibers 4 to 6, obtained in Examples 5 to 7 of the present invention, as a function of carbonization temperature in the voltage range of 0 to 1.

The specific capacitances of supercapacitor electrodes 1 to 3 comprising porous carbon nanofibers 4 to 6 prepared in Example 10 were measured as a function of carbonization temperature, and the results are shown graphically in FIG. 13. The specific capacitances of the carbon nanofibers as a function of carbonization temperature in FIG. 13 showed a tendency similar to those in the results of measurement of CVs shown in FIG. 12, and the carbon nanofibers showed a high specific capacitance of 161.39 F/g at a low carbonization temperature of 800° C. This is because the carbon nanofibers carbonized at a low temperature of 800° C. contained large amounts of heteroatoms such as silicon (Si), oxygen (O) and nitrogen (N), which allowed the electrode to exhibit high specific capacitance, high energy density and high power density because of electric double-layer capacitance and pseudo-capacitance.

Test Example 10

Porous carbon nanofibers 1 to 6 obtained in Examples 2 to 7 were quantitatively analyzed by X-ray photoelectron spectroscopy (XPS), and the analysis results are shown in Table 4 below.

TABLE 4

| Carbonization temperature | C 1s % | O 1s % | N 1s % | Si 2p % |
|---|---|---|---|---|
| Porous carbon nanofibers 1,4 carbonized at 800° C. | 83.4 | 9.90 | 6.00 | 0.70 |
| Porous carbon nanofibers 2,5 carbonized at 900° C. | 85.2 | 9.48 | 4.58 | 0.74 |
| Porous carbon nanofibers 3,6 carbonized at 1000° C. | 89.9 | 6.01 | 3.51 | 0.55 |

As can be seen in Table 4 above, as the carbonization temperature increased, the ratio of the carbon (C) atom increased, but the ratio of heteroatoms such as silicon (Si), oxygen (O) and nitrogen (N) decreased.

Test Example 11

Figure 14:
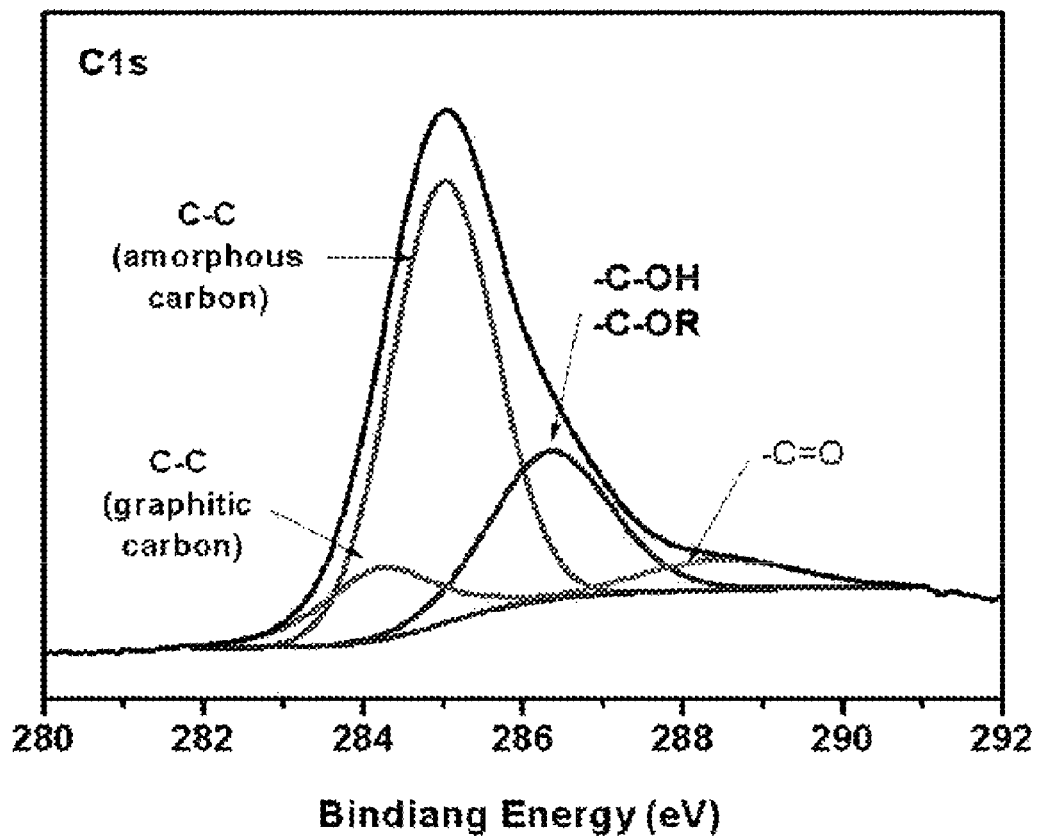
FIG. 14 is a graphic diagram showing the results of separating the peak of a carbon element (C) in porous carbon nanofibers 4, obtained in Example 5 of the present invention, by X-ray photoelectron spectrometry (XPS).
Figure 15:
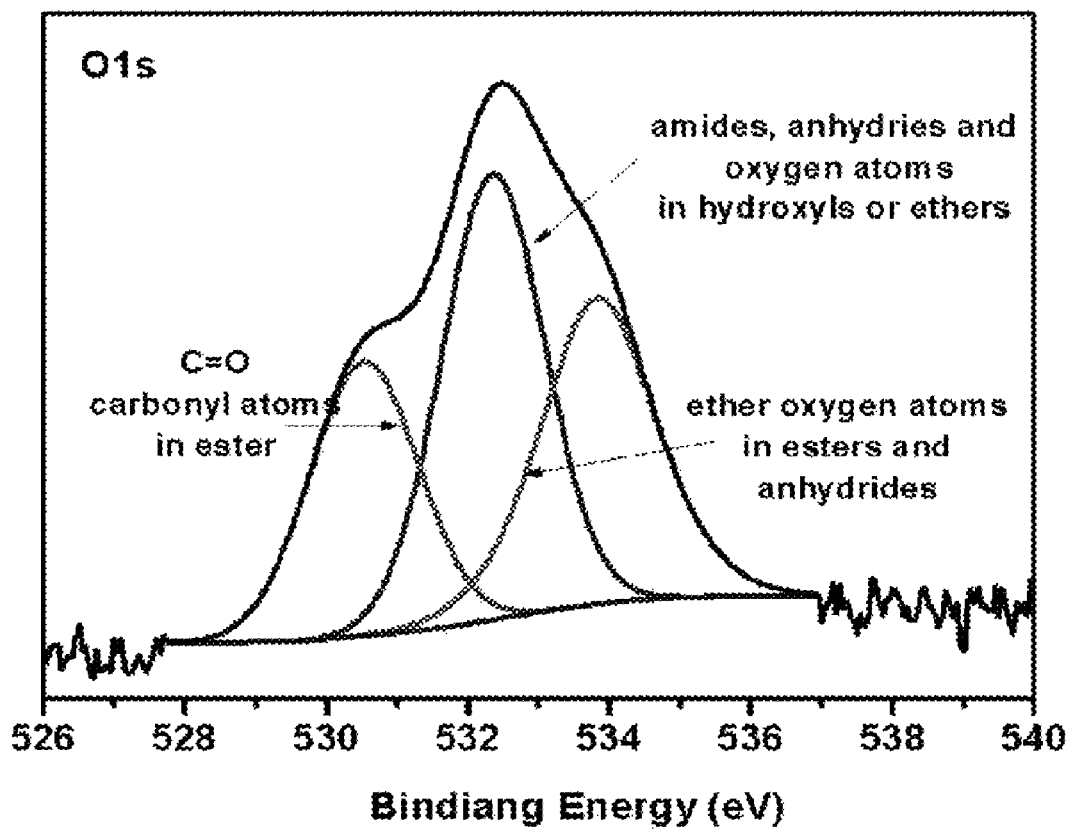
FIG. 15 is a graphic diagram showing the results of separating the peak of an oxygen element (O) in porous carbon nanofibers 4, obtained in Example 5 of the present invention, by X-ray photoelectron spectrometry (XPS).
Figure 16:
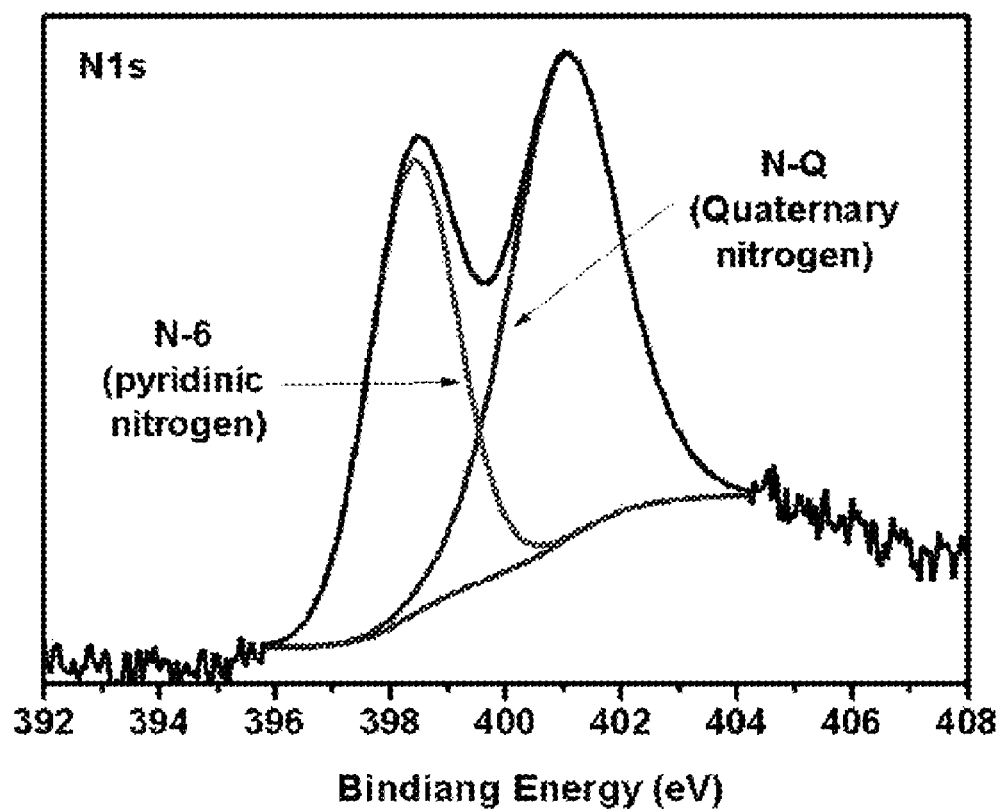
FIG. 16 is a graphic diagram showing the results of separating the peak of a nitrogen element (N) in porous carbon nanofibers 4, obtained in Example 5 of the present invention, by X-ray photoelectron spectrometry (XPS).

The peaks of carbon (C), oxygen (O) and nitrogen (N) elements in porous carbon nanofibers 4 obtained in Example 4 were analyzed by X-ray photoelectron spectroscopy (XPS). As a result, it can be seen in FIGS. 14 to 16 that carbon, oxygen and nitrogen were separated into 4, 3 and 2 binding energy peaks, respectively.

In addition, for porous carbon fibers 1 to 6 obtained in Examples 2 to 7, the peaks of carbon (C), oxygen (O) and nitrogen (N) elements were analyzed by X-ray photoelectron spectroscopy, and the percentages of functional groups in these peaks, that is, the XPS of C1s, the XPS of O1s and the XPS of N1s, are shown in Tables 5 to 7, respectively. These results show that as the carbonization temperature decreases, the percentage of crystalline graphite structures in the carbon nanofibers decreases, and thus the crystallinity of the fibers decreases, whereas the percentages of functional groups in the carbon nanofiber surface increase.

TABLE 5

| Carbonization temperature | C—C graphite | C—C amorphous | C—OH, C—OR | COOH, COOR |
|---|---|---|---|---|
| Porous carbon nanofibers 1,4 carbonized at 800° C. | 6.25 | 53.56 | 19.67 | 9.32 |
| Porous carbon nanofibers 2,5 carbonized at 900° C. | 9.32 | 52.6 | 20.14 | 4.93 |
| Porous carbon nanofibers 3,6 carbonized at 1000° C. | 11.87 | 49.93 | 18.42 | 4.46 |

TABLE 6

| Carbonization temperature | C=O carbonyl atoms in ester | Amides, anhydrides, and oxygen atoms in hydroxyls or ethers | Ether oxygen atoms in esters and anhydrides |
|---|---|---|---|
| Porous carbon nanofibers 1,4 carbonized at 800° C. | 2.76 | 5.38 | 2.70 |
| Porous carbon nanofibers 2,5 carbonized at 900° C. | 2.20 | 3.39 | 2.12 |
| Porous carbon nanofibers 3,6 carbonized at 1000° C. | 2.38 | 2.39 | 1.65 |

TABLE 7

| Carbonization temperature | N-6 (pyridinic nitrogen) | N-Q (quaternary nitrogen) |
|---|---|---|
| Porous carbon nanofibers 1,4 carbonized at 800° C. | 3.92 | 2.9 |
| Porous carbon nanofibers 2,5 carbonized at 900° C. | 3.67 | 1.84 |
| Porous carbon nanofibers 3,6 carbonized at 1000° C. | 2.79 | 0.64 |

Test Example 12

Figure 17:
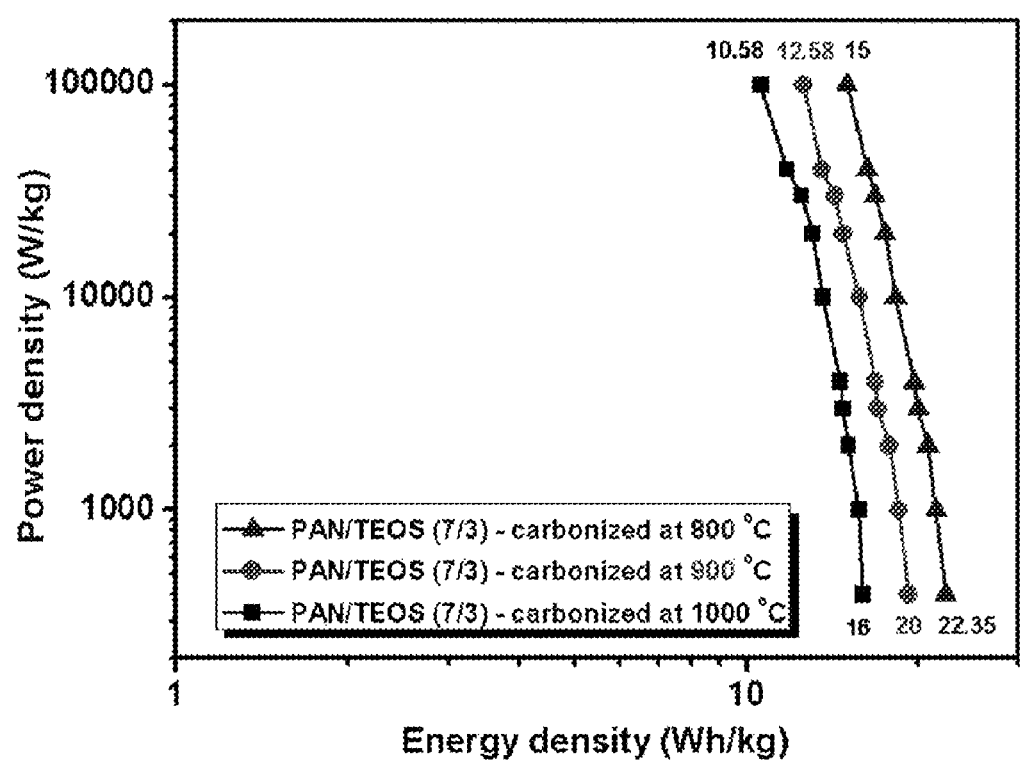
FIG. 17 is a set of Ragon graphs showing the results of measuring the energy and power densities of capacitors comprising porous carbon nanofibers 4 to 6, obtained in Examples 5 to 7 of the present invention, as a function of the carbonization temperature of the porous carbon nanofibers.

The energy and power densities of supercapacitor electrodes 1 to 3 of Example 10 comprising porous carbon nanofibers obtained in Examples 5 to 7 were measured as a function of carbonization temperature in an aqueous electrolyte solution of 6M KOH, and the results are shown in FIG. 17 as Ragon graphs. As can be seen in FIG. 17, the supercapacitors showed a high energy density of 22 Wh/kg and a high power density of 100 kW/kg.

Test Example 13

Figure 18:
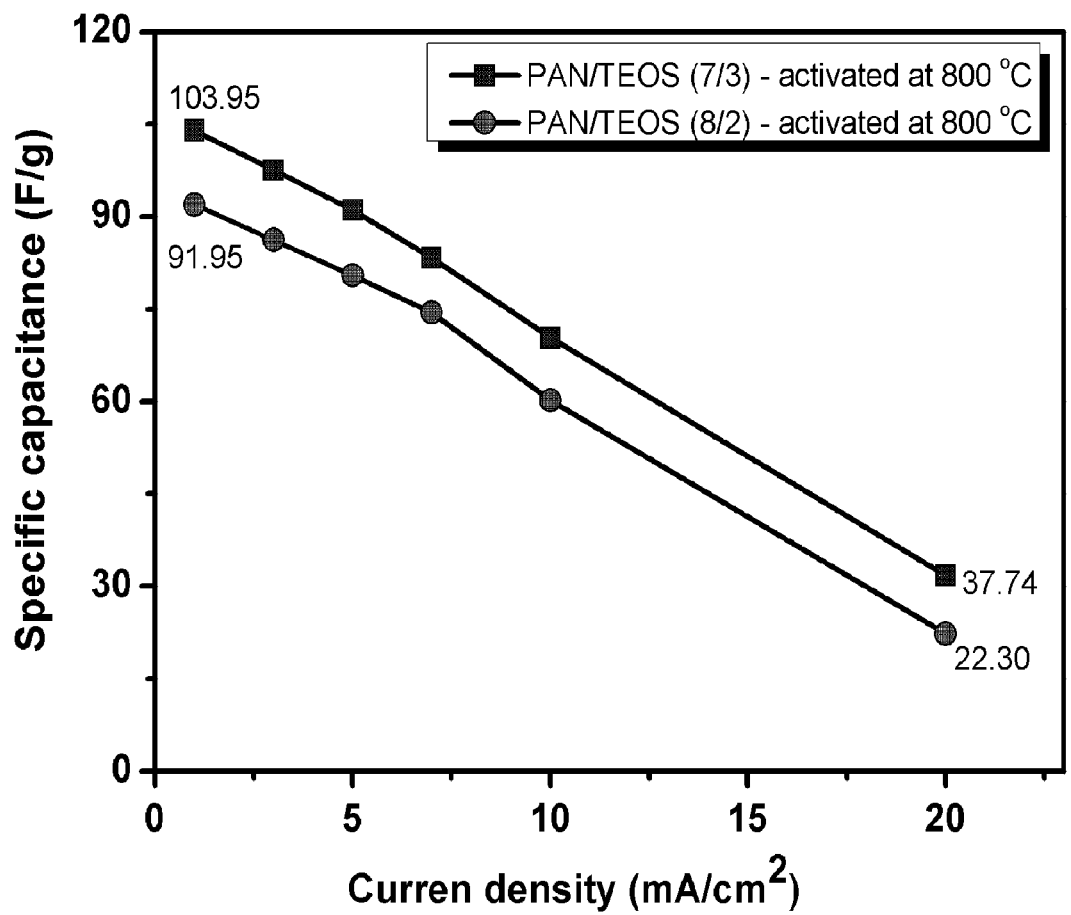
FIG. 18 is a graphic diagram showing the specific capacitances of capacitors comprising porous carbon fibers 7 and 8, obtained in Examples 8 and 9 of the present invention, in the voltage range of 0 to 2.7 as a function of the weight ratio of TEOS in the porous carbon nanofibers.

The specific capacitances of supercapacitors 4 and 5 of Example 11 comprising porous carbon nanofibers 7 and 8 obtained in Examples 8 and 9 were measured as a function of the weight ratio of TEOS of the porous carbon nanofibers in the voltage range of 0-2.7 V, and the measurement results are shown in FIG. 18.

As can be seen in FIG. 18, the capacitors showed specific capacitances of 103.95 and 120.93 F/g, suggesting that these are supercapacitors.

Test Example 14

Figure 19:
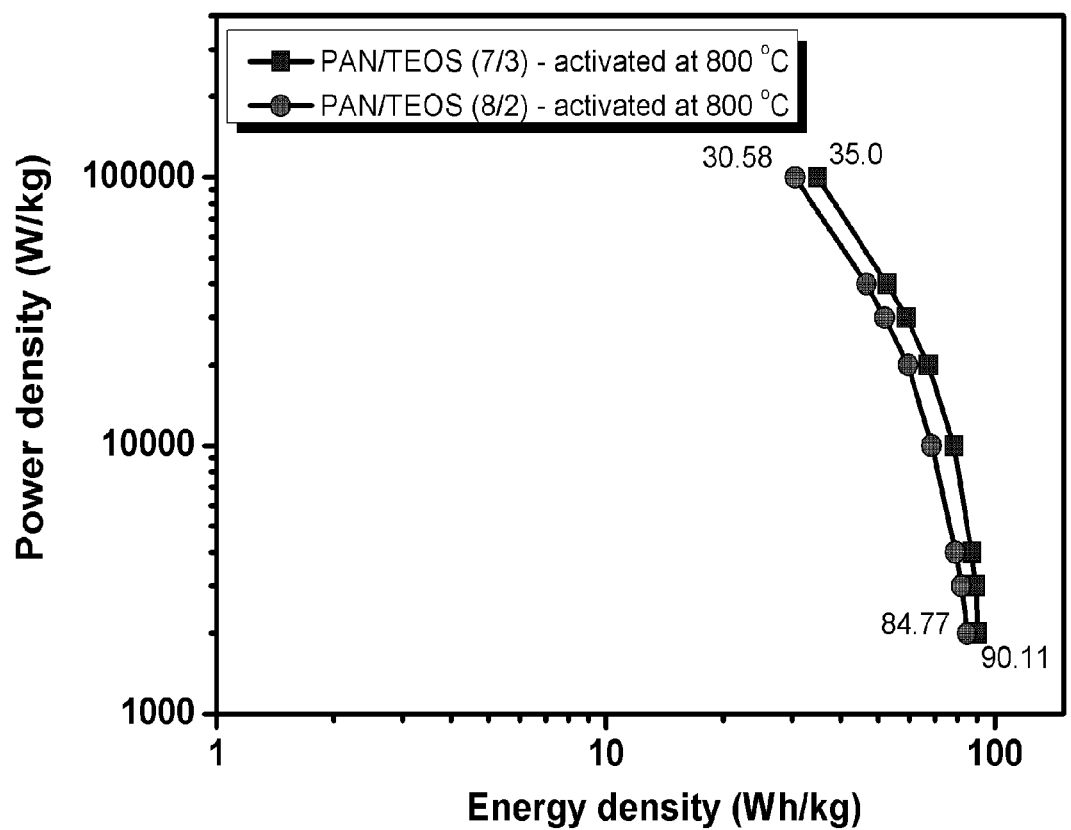
FIG. 19 is a set of Ragon graphs showing the results of measuring the energy and power densities of capacitors comprising porous carbon nanofibers 7 and 8, obtained in Examples 8 and 9 of the present invention, as a function of the weight ratio of TEOS in the porous carbon nanofibers.

The energy and power densities of supercapacitors 4 and 5 of Example 11 comprising porous carbon nanofibers 7 and 8 obtained in Examples 8 and 9 were measured as a function of the weight ratio of TEOS, and the measurement results are shown in FIG. 19 as Ragon graphs. As can be seen in FIG. 19, the supercapacitors showed an energy density of 90-35 Wh/kg and a power density of 2-100 kW/kg in a 1.5 M organic solvent electrolyte solution of tetraethylammonium tetrafluoroborate in acetonitrile.

From the above test results, it can be seen that the porous carbon nanofibers prepared by carbonization in the preparation method of the present invention contain the metal alkoxide introduced into the carbon crystal, and have a diameter of 100-300 nm and a specific surface area of 700-1500 m²/g and include fine pores having a size of 1-3 nm. Thus, it is concluded that these porous carbon nanofibers can increase the dielectric constant between an electrolyte and the electrode surface or induce the Faraday reaction, thus improving energy density.

In addition, the carbon nanofibers prepared at low carbonization temperature show fast selective adsorption and desorption even when the potential changes slightly. Thus, such carbon nanofibers allow the cost of the carbonization process to be reduced and can be provided with high conductivity, a high specific surface area and fine pores having various sizes, which are controlled depending on the carbonization temperature.

Furthermore, the porous carbon nanofibers prepared through physical activation in the preparation method of the present invention have a diameter of 100-250 nm and a specific surface area of 1300-1700 m$^2$/g and include fine pores and mesopores, which have a size of 2 nm or greater. Thus, it can be seen that steam accelerates the sol-gel reaction in the physical activation process to increase the specific surface area and the formation of fine pores and mesopores, which contain the metal oxide. Specifically, steam which is used in the physical activation process promotes the hydrolysis and condensation of the metal alkoxide to produce a metal oxide, and water and alcohol which are removed when the metal oxide is produced accelerate the sol-gel reaction according to Le Chatelier's principle to increase the production of fine pores in the surface and to produce mesopores.

As a result, it can be seen that the porous carbon nanofibers prepared using the carbonization process or physical activation process of the present invention all have excellent electrochemical properties, capacitance, power density and energy density, and particularly, the porous carbon nanofibers prepared using the physical activation process can provide supercapacitors having high energy density, compared to capacitors comprising the porous carbon nanofibers prepared using the carbonization process.

Thus, the porous carbon nanofiber nanofibers prepared by the method of the present invention have excellent properties as demonstrated in the above test examples, and can be used in supercapacitors. In addition, although specifically not described, the porous carbon nanofibers of the present invention can be used in various industrial fields, including adsorbent materials.

Moreover, because the porous carbon nanofibers of the present invention have pores exposed to the outside, contaminants can get close to the carbon nanofibers, suggesting that the carbon nanofibers can be used as filter materials. Also, the porous carbon nanofibers are highly useful as materials for electric double-layer supercapacitors and secondary batteries, as well as electromagnetic wave-shielding materials and highly conductive materials.

One or more embodiments of the present invention has the following excellent effects.

First, according to the present invention, highly porous carbon nanofibers can be prepared by adding a metal alkoxide to a carbon fiber precursor solution and carrying out a sol-gel reaction of the metal alkoxide without a chemical activation process. The carbon nanofibers prepared by the present invention have a large specific surface area and improved electrical conductivity.

Also, according to the present invention, carbon nanofibers having ultrafine and highly porous fiber webs are prepared through carbonization or physical activation, and thus activated/carbon nanofibers and products comprising the same can be prepared in a cost and time-effective manner.

In addition, the properties of the carbon nanofibers are easily controlled as desired by controlling one or more of the concentration of the metal alkoxide, the heat-treatment temperature and time and the activation process to control the specific surface area and pore size distribution of the metal alkoxide-containing carbon nanofibers.

Furthermore, according to the present invention, a metal alkoxide is introduced into the carbon crystals of the carbon nanofibers so that the dielectric constant between an electrolyte and the electrode surface can be increased to increase energy density, and the carbon nanofibers can show fast adsorption and desorption even when energy changes slightly, and thus have excellent storage properties and provide high-performance capacitors.

Moreover, according to the present invention, a high-capacitance capacitor having excellent electrochemical properties, charge/discharge characteristics, and energy and power densities can be provided by applying carbon nanofibers having porous fiber webs, prepared by a carbonization process, to an aqueous electrolyte.

In addition, according to the present invention, a supercapacitor can be provided by applying porous carbon nanofibers, prepared through an activation process using a steam-containing gas such that a metal oxide remains, to an organic solvent electrolyte, the capacitor having significantly improved electrochemical characteristics, capacitance, power density and energy density and being capable of being applied to power storage devices.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing porous carbon fibers, the method comprising:
   preparing a carbon nanofiber precursor solution containing a carbon nanofiber precursor and a metal alkoxide [M(OR)$_n$];
   electrospinning the precursor solution to obtain electrospun fibers, wherein the precursor solution is prepared to contain the carbon nanofiber precursor and the metal alkoxide at a ratio of 70-99: 30-1 wt %;
   stabilizing the electrospun fibers to obtain stabilized fibers; and
   carbonizing or physically activating the stabilized fibers to obtain porous carbon fibers.

2. The method of claim 1, wherein the stabilized fibers are physically activated to obtain the porous carbon fibers.

3. The method of claim 1, wherein the metal alkoxide is Si-alkoxide, Ti-alkoxide, Al-alkoxide, Zn-alkoxide, or a combination thereof.

4. A method for preparing porous carbon fibers, the method comprising:
   preparing a carbon nanofiber precursor solution containing a carbon nanofiber precursor and a metal alkoxide [M(OR)$_n$];
   electrospinning the precursor solution to obtain electrospun fibers;
   stabilizing the electrospun fibers to obtain stabilized fibers, wherein the stabilization is carried out by placing the electrospun fibers in an air circulating furnace, supplying compressed air to the furnace at a flow rate of 5-20 mL/min, and maintaining the fibers at 200~300° C. at a heating rate of 1° C./min for 30 minutes or more; and
   carbonizing or physically activating the stabilized fibers to obtain porous carbon fibers.

5. A method for preparing porous carbon fibers, the method comprising:
- preparing a carbon nanofiber precursor solution containing a carbon nanofiber precursor and a metal alkoxide [M(OR)$_n$];
- electrospinning the precursor solution to obtain electrospun fibers;
- stabilizing the electrospun fibers to obtain stabilized fibers, wherein the stabilized fibers are carbonized to obtain the porous carbon fibers, and the carbonizing is carried out by heating the fibers to 700~1500° C. at a rate of 5° C./min in an inert or vacuum atmosphere, and then maintaining the fibers at that temperature for 30 minutes or more.

6. The method of claim 2, wherein the physical activation is carried out by heating the fibers to 700~850° C. at a rate of 5° C./min, and then maintaining the fibers in an atmosphere of 150-250 mL/min of inert gas and 5-15 vol % of steam for 30 minutes or more.

7. The method of claim 1, wherein one or more of a diameter and a surface porosity of the carbon nanofibers is controlled by controlling one or more of the concentration of the metal alkoxide, the carbonization temperature and time, and the physical activation temperature and time.

* * * * *